United States Patent Office 2,818,356
Patented Dec. 31, 1957

2,818,356

PROCESS FOR PREPARING FREE-FLOWING SUGAR POWDERS

Martin W. Shookhoff, Cincinnati, Ohio, assignor to Fries & Fries, Inc., Cincinnati, Ohio, a corporation of Ohio No Drawing. Application January 5, 1956
Serial No. 557,459

5 Claims. (Cl. 127—30)

My invention relates to a process for preparing free-flowing sugar powders and has to do, more particularly, with a process for preparing free-flowing, non-hygroscopic powders from sugars and sugar derivatives containing gums or other colloids, that normally render powders prepared therefrom sticky and hygroscopic.

The principal object of my invention is to provide a method of preparing free-flowing, non-hygroscopic powders from crude sugars and sugar derivatives which, in powder form, are normally sticky and hygroscopic, due to the gums and colloidal materials contained therein.

One of the main objects of my invention is to provide a process for making free-flowing, non-hygroscopic brown sugar, but I comprehend within the term "brown sugar," powders prepared from molasses, honey and caramel coloring.

It is well known that certain partly refined sugars, such as the various grades of brown sugar, are difficult to handle or dispense because of their sticky and hygroscopic character. That is true likewise of the materials derived by dehydration of molasses, honey and caramel coloring, all of which may be classified as sugars or sugar derivatives. It is an object of my invention to provide an economical and efficient method of rendering such materials free-flowing and non-hygroscopic so that they may be handled or dispensed more easily.

In general, my invention consists in mixing with the sugar material, which has a moisture content of from 1% to 5% and is normally sticky and hygroscopic, a minor proportion of pregelatinized starch, and then heating this mixture, at a temperature below 160° F., to remove the contained moisture. The resulting material is then ground to the desired fineness and the end product is a free-flowing, non-hygroscopic powder containing a major proportion of sugar. The amount of pregelatinized starch to be added will vary, depending on the crudeness of the starting material, from 0.5% to 10%. I believe this to be due to the fact that the cruder materials contain larger proportions of gummy and colloidal materials, and so require more pregelatinized starch to render them innocuous and to impart the desired properties to the finished product.

Pregelatinized starch is a well-known commercial product, the precise chemical composition of which cannot be defined. Such pregelatinized starches are marketed under the trade names of "Instant Jel," "Instant Starch PB-2B," "Instant Starch HRW-11" and "Snowflake Instant Starch," and I include all of these products, and like starch products, under the term "pregelatinized starch."

The following are specific examples of embodiments of my invention:

*Example I*

Brown sugar, of a grade known commercially as "No. 7 Brown Sugar," containing about 4% of moisture, is mixed with about 1% by weight of pregelatinized starch, and the mixture is heated, at a temperature of 140° F. or less, until the contained moisture is driven off. The material is then ground to the desired fineness. Although the brown sugar used was sticky and hygroscopic, the resulting powder is free-flowing and non-hygroscopic and can be handled and dispensed with great facility.

*Example II*

Brown sugar of a grade known commercially as "No. 13 Brown Sugar," containing about 4% of moisture, is mixed with about 2% by weight of pregelatinized starch, and the mixture is heated, at a temperature of 140° F. or less, until the contained moisture is driven off. The material is then ground to the desired fineness. Although the brown sugar used was sticky and hygroscopic, the resulting powder is free-flowing and non-hygroscopic and can be handled and dispensed easily.

*Example III*

A molasses powder, which is essentially a very crude brown sugar, is prepared by dehydration of molasses, as by spray drying. This molasses powder contains about 4% or 5% moisture and is sticky and hygroscopic, so that it is very difficult to handle or dispense. This molasses powder is mixed with 10% by weight of pregelatinized starch, and the mixture is heated, at a temperature of 140° F. or less, until the contained moisture is driven off. The material is then ground to the desired fineness and a powder is produced thereby which is free-flowing and non-hygroscopic, and can be handled and dispensed easily.

*Example IV*

A honey powder is prepared by dehydration of honey, as by spray drying, evaporation at low temperatures, or mixture with a dried powder such as anhydrous dextrose. The honey powder so prepared will contain from 4% to 5% of moisture, and is sticky and hygroscopic, and very difficult to handle or dispense. This honey powder is mixed with 10% by weight of pregelatinized starch, and the mixture is heated, at a temperature of 120° F. or less, until the contained moisture is driven off. The material is then ground to the desired fineness and the resulting powder is free-flowing and non-hygroscopic, and can be dispensed and handled easily.

*Example V*

A powder is prepared by dehydration of caramel coloring, a sugar derivative, until the moisture content is reduced to from 4% to 5%. This powder is sticky and hygroscopic and, hence, difficult to handle and dispense. This powder is mixed with 10% by weight of pregelatinized starch, and the mixture is heated, at a temperature of 140° F. or less, until the contained moisture is driven off. The material is then ground to the desired fineness and the resulting powder is free-flowing and con-hydroscopic, and can be handled and dispensed easily.

To explain my invention more clearly I shall set forth what I believe to be the theory accounting for its success, it being understood that I am not to be limited by any statements of theory herein. I believe that the sticky and hygroscopic character of brown sugar, and the other sugar powders referred to above, is due to the presence therein of gums and colloids, which have not been removed by the refining process. I believe, further, that the gummy colloidal materials, responsible for the stickiness, form "inclusion complexes" with the pregelatinized starch, or one or more of the chemical entities present therein. "Inclusion complexes" are a recently discovered type of combination in which the "included" compound, in this case the gummy colloidal material, is considered to be enmeshed on a molecular scale in the crystal lattice of the "host" compound, in this case the pregelatinized starch. In such an "inclusion complex" the "included" compound is completely protected from the effect of the atmosphere by the "host" compound. I believe that this theory may account for the free-flowing and non-hygroscopic character of the resulting powder, the gummy colloidal material being rendered innocuous, although not removed, by the formation of an inclusion complex.

I have found that the sugar or sugar derivative mixed with the pregelatinized starch should contain not less than 1% and not more than 5% of moisture. If the moisture content is below 1%, the process is not effective, doubtless because an "inclusion complex" is not formed. If the moisture content exceeds 5% it is extremely difficult to effect the mixture with pregelatinized starch. The removal of moisture from the mixture can be effected by heating up to 160° F., except in the case of honey powder, such as described in Example IV, where the temperature should not exceed 120° F., since temperatures above that will cause undesirable changes in the flavor of the product.

I am aware that the method herein disclosed may be varied considerably without departing from the spirit of my invention and, therefore, I claim my invention broadly, as indicated by the appended claims.

Having thus described my invention, what I claim as new and useful, and desire to secure by United States Letters Patent, is:

1. The process of converting a sticky, hygroscopic, sugary powder into a free-flowing, non-hygroscopic powder comprising the steps of mixing the sticky powder with not more than 10% by weight of pregelatinized starch, heating the mixture to a moisture content of from 1% to 5%, and grinding said mixture.

2. The process of claim 1 in which from 0.5% to 10% by weight of pregelatinized starch is mixed with the sticky powder.

3. The process of claim 2 in which the removal of contained moisture is effected by heating to a temperature not exceeding 120° F.

4. The process of converting sticky, hygroscopic brown sugar into a free-flowing, non-hygroscopic powder comprising the steps of mixing the brown sugar with from 0.5% to 2% by weight of pregelatinized starch, heating the mixture, at a temperature not exceeding 160° F., to a moisture content of from 1% to 5%, and grinding the mixture to a powder of the desired fineness.

5. The process of converting a sticky, hygroscopic, sugary powder into a free-flowing, non-hygroscopic powder comprising the steps of mixing a major proportion of the sticky powder with a minor proportion of pregelatinized starch to render the mixture free-flowing and non-hygroscopic in character when freed of moisture and ground to a powder, heating the mixture to remove the free moisture in excess of 5%, and grinding said mixture.

References Cited in the file of this patent

UNITED STATES PATENTS

| | | |
|---|---|---|
| 1,968,628 | Alton | July 31, 1934 |
| 2,329,694 | Bodman | Sept. 21, 1943 |
| 2,400,292 | Dalton | May 14, 1946 |
| 2,554,143 | Hinz | May 22, 1951 |
| 2,613,150 | Holden | Oct. 7, 1952 |

OTHER REFERENCES

Chemistry and Industry of Starch, Kerr, pub. by Academic Press Inc., New York, N. Y., 1950, 2nd ed., p. 565.